(12) United States Patent
Muramatsu et al.

(10) Patent No.: US 8,233,096 B2
(45) Date of Patent: Jul. 31, 2012

(54) INFORMATION PROCESSING APPARATUS AND TELEVISION TUNER

(75) Inventors: Yasuhiro Muramatsu, Tokyo (JP); Toshiyuki Katsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 199 days.

(21) Appl. No.: 12/753,540

(22) Filed: Apr. 2, 2010

(65) Prior Publication Data

US 2010/0265391 A1    Oct. 21, 2010

(30) Foreign Application Priority Data

Apr. 16, 2009  (JP) ................ P2009-100172

(51) Int. Cl.
  *H04N 5/50* (2006.01)
  *H04N 5/44* (2006.01)
(52) U.S. Cl. ................. 348/731; 348/725
(58) Field of Classification Search .......... 348/725, 348/731–733, 553–555, 558, 563–565, 567, 348/569; 725/38, 39, 40, 57, 59, 61, 100, 725/131, 134, 139, 142, 151; *H04N 5/44, H04N 5/50, 5/46, 5/445*
See application file for complete search history.

(56) References Cited

U.S. PATENT DOCUMENTS

| | | | |
|---|---|---|---|
| 7,489,786 | B2 | 2/2009 | Marlowe |
| 7,733,422 | B2* | 6/2010 | Aggarwal et al. ............ 348/731 |
| 2002/0008787 | A1 | 1/2002 | Kurihara |
| 2002/0036709 | A1 | 3/2002 | Nishida |
| 2003/0071918 | A1* | 4/2003 | Takano et al. ................ 348/552 |
| 2004/0098739 | A1 | 5/2004 | Rakib |
| 2005/0231640 | A1* | 10/2005 | Dabrowa ..................... 348/732 |
| 2008/0291337 | A1 | 11/2008 | Nakajima et al. |
| 2009/0064265 | A1 | 3/2009 | Takeda et al. |

FOREIGN PATENT DOCUMENTS

| | | |
|---|---|---|
| JP | 3119745 | 2/2006 |
| JP | 2006-321470 | 11/2006 |
| JP | 2008-85553 | 4/2008 |

OTHER PUBLICATIONS

English-Language European Search Report from the European Patent Office for European Application No. EP 10 25 0517 mailed Jan. 23, 2012.

* cited by examiner

*Primary Examiner* — Sherrie Hsia
(74) *Attorney, Agent, or Firm* — Finnegan Henderson Farabow Garrett & Dunner LLP

(57) ABSTRACT

An information processor includes an operation unit for receiving a selected analog television channel, an identification signal generator for generating, from the selected channel, an analog identification signal for identifying the frequency of an analog broadcast signal, an identification signal acquirer for acquiring the analog identification signal, a storage for prestoring correspondence information between a digital identification signal indicating a frequency of a digital broadcast signal and the analog identification signal for each of stations, an identification signal converter for converting the analog identification signal into the digital identification signal using the correspondence information, a receiver for receiving a digital broadcast signal identified by the digital identification signal and extract video and audio code, a video converter and an audio converter for converting the code into equivalent analog video and audio signals, and an analog video acquirer and an analog sound acquirer for acquiring the analog video and audio signals.

14 Claims, 4 Drawing Sheets

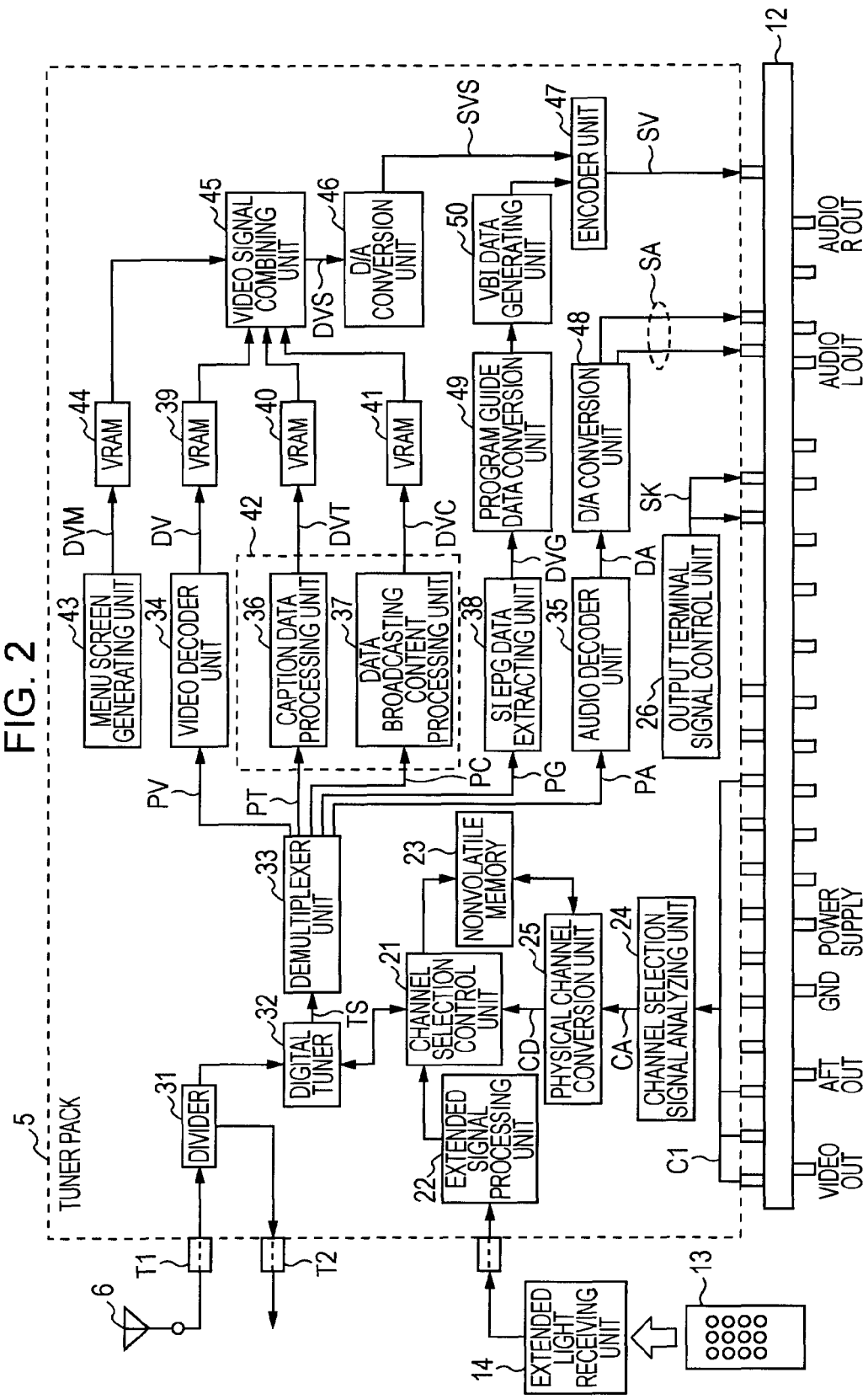

FIG. 3A

| | ANALOG BROADCAST PHYSICAL CHANNEL | DIGITAL BROADCAST DISPLAY CHANNEL | DIGITAL BROADCAST PHYSICAL CHANNEL |
|---|---|---|---|
| TERRESTRIAL BROADCASTING | VHF Ch 1 (NHK GENERAL TV) | 011 | UHF Ch 27 |
| | VHF Ch 3 (NHK EDUCATIONAL TV) | 021 | UHF Ch 26 |
| | VHF Ch 4 (NIPPON TV) | 041 | UHF Ch 25 |
| | VHF Ch 6 (TBS) | 061 | UHF Ch 22 |
| | VHF Ch 8 (FUJI TV) | 081 | UHF Ch 21 |
| | VHF Ch 10 (TV ASAHI) | 051 | UHF Ch 24 |
| | VHF Ch 12 (TV TOKYO) | 071 | UHF Ch 23 |

FIG. 3B

| | ANALOG BROADCAST PHYSICAL CHANNEL | DIGITAL BROADCAST DISPLAY CHANNEL | DIGITAL BROADCAST PHYSICAL CHANNEL |
|---|---|---|---|
| BS | Ch 5 (WOWOW) | 191 | Ch 3 |
| | Ch 7 (NHK BS1) | 101 | Ch 15 |
| | Ch 9 (NHK Hi-VISION) | 103 | Ch 15 (MUSE-ENCODING NEEDED) |
| | Ch 11 (NHK BS2) | 102 | Ch 15 |

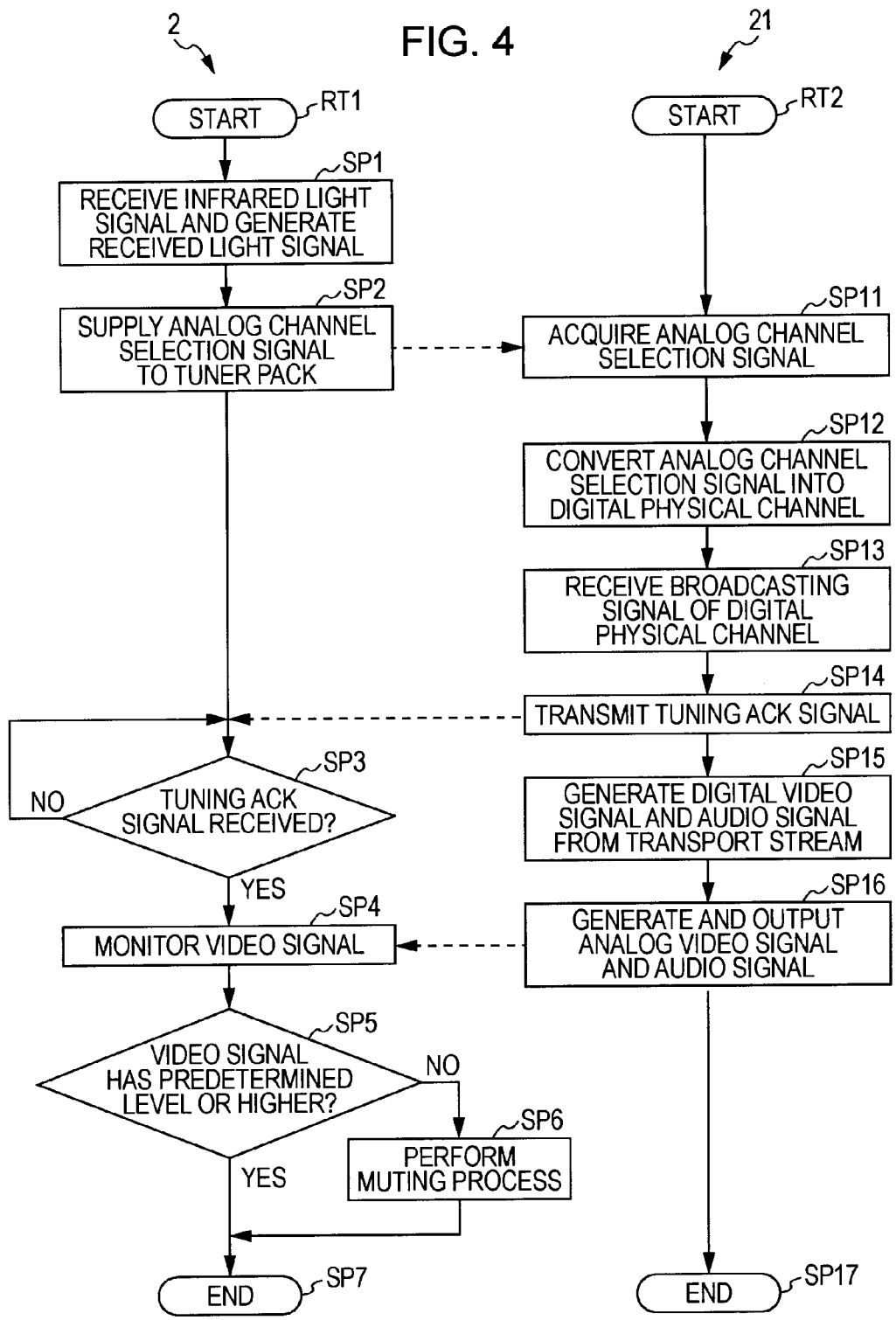

INFORMATION PROCESSING APPARATUS AND TELEVISION TUNER

BACKGROUND OF THE INVENTION

1. Field of the Invention

The present invention relates to an information processing apparatus and a television tuner and, in particular, to an information processing apparatus and a television tuner that are suitable for users to view a digital television program using an analog television set.

2. Description of the Related Art

Widely used analog television sets receive broadcast signals of an analog television program and allow the users to enjoy looking at and listening to video and sound based on the broadcast signals.

Such television sets perform a predetermined demodulation process on broadcast signals, generate analog video signals and audio signals, and supply the video signals to a display unit, such as a cathode ray tube. Thus, video is displayed. In addition, the television sets amplify the audio signal and supply the audio signal to a speaker. Thus, sound is output from the speaker.

In recent years, in order to increase the resolution of a video image and the quality of audio sound, provide a better service about a program, and efficiently use frequency bands, digital television programs have been broadcasted.

A television broadcast signal in a digital format (hereinafter referred to as a "digital broadcast signal") can be received by a television tuner based on a digital technique (hereinafter referred to as a "digital tuner"). However, it is difficult for a television tuner based on analog technique (hereinafter referred to as an "analog tuner") to receive a digital broadcast signal.

Accordingly, a technique for converting a digital broadcast signal into a television broadcast signal in an analog format (hereinafter referred to as an "analog broadcast signal") and supplying the analog broadcast signal to a television set has been developed (refer to, for example, Japanese Registered Utility Model No. 3119745 and, in particular, FIG. 2).

In this technique, a television set including an analog tuner allows users to view video and listen to sound extracted from a digital broadcast signal by acquiring a converted analog signal. Hereinafter, this technique is referred to as a "first method".

In addition to the first method, a technique for using a television set as only a monitor device by simultaneously using a television broadcast receiver (i.e., a set top box) including a digital tuner has been developed. Hereinafter, this technique is referred to as a "second method".

SUMMARY OF THE INVENTION

However, according to the first method, a conversion unit for converting a digital broadcast signal into an analog broadcast signal has to have digital tuners and analog RF circuits for the number of broadcasting channels. Thus, the configuration becomes complicated and, therefore, the cost is increased.

In contrast, according to the second method, only a single digital tuner is sufficient. However, it is necessary for a user to operate the television set using a remote controller different from a remote controller generally attached to the television set and a different operation sequence. Thus, it is inconvenient for the user.

As described above, according to existing methods, a user can view a digital broadcast program using a television set including an analog tuner. However, a problem of complicated configuration of the television set or a problem of inconvenience for the user arises.

Accordingly, the present invention provides an information processing apparatus and a television tuner capable of receiving digital television broadcast programs using a simple configuration and providing operability as for an analog television set to the users.

According to an embodiment of the present invention, an information processing apparatus includes an operation receiving unit configured to wait for input of an operation to select an analog television broadcast channel, an identification signal generating unit configured to generate, on the basis of the selected channel, an analog identification signal for identifying a frequency at which a broadcast signal is broadcasted in an analog format, an identification signal acquiring unit configured to acquire the analog identification signal from the identification signal generating unit, a storage unit configured to prestore correspondence information regarding a correspondence between a digital identification signal for identifying a frequency at which a broadcast signal is broadcasted in a digital format and the analog identification signal for each of broadcast stations, an identification signal conversion unit configured to convert the analog identification signal into the digital identification signal using the correspondence information, a broadcast receiving unit configured to receive a digital broadcast signal using the frequency identified by the digital identification signal converted by the identification signal conversion unit and extract digital video code and audio code, a video conversion unit configured to convert the digital video code into an analog video signal having a video format equivalent to a video signal acquired from an analog television broadcast, an audio conversion unit configured to convert the digital audio code into an analog audio signal having an audio format equivalent to an audio signal acquired from an analog television broadcast, an analog video acquiring unit configured to acquire the analog video signal, and an analog sound acquiring unit configured to acquire the analog audio signal.

In this way, the information processing apparatus according to the embodiment can convert an analog identification signal based on a channel selection operation into a digital identification signal for identifying a broadcast station that is the same as the broadcast station identified by the analog identification signal and, subsequently, receive a broadcast signal in a digital format.

In addition, the information processing apparatus can convert video and sound based on the video code and audio code acquired from the received digital broadcast signal into a video signal and an audio signal in a format equivalent to those acquired when an analog broadcast is received.

According to another embodiment of the present invention, a television tuner includes an identification signal acquiring unit configured to acquire an analog identification signal for identifying a frequency at which a broadcast signal is broadcasted in an analog format, the identification signal being generated in accordance with a television channel selecting operation, a storage unit configured to prestore correspondence information regarding a correspondence between a digital identification signal for identifying a frequency at which a broadcast signal is broadcasted in a digital format and the analog identification information for each of broadcast stations, an identification signal conversion unit configured to convert the analog identification signal into the digital identification signal using the correspondence information, a broadcast receiving unit configured to receive a digital broadcast signal using the frequency identified by the digital identification signal converted by the identification signal conversion unit and extract digital video code and audio code, a video conversion unit configured to convert the digital video code into an analog video signal having a video format equivalent to a video signal acquired from an analog television broadcast, and an audio conversion unit configured to convert the digital audio code into an analog audio signal having an audio format equivalent to an audio signal acquired from an analog television broadcast.

In this way, the television tuner according to the embodiment of the present invention can convert an analog identification signal based on a channel selection operation into a digital identification signal for identifying a broadcast station that is the same as the broadcast station identified by the analog identification signal and, subsequently, receive a broadcast signal in a digital format. In addition, the television tuner can convert video and sound based on the video code and audio code acquired from the received digital broadcast signal into a video signal and an audio signal in a format equivalent to those acquired when an analog broadcast is received.

According to the embodiments of the present invention, an analog identification signal based on a channel selection operation can be converted into a digital identification signal for identifying a broadcast station that is the same as the broadcast station identified by the analog identification signal and, subsequently, a broadcast signal in a digital format can be received. In addition, according to the embodiments of the present invention, video and sound based on the video code and audio code acquired from the received digital broadcast signal can be converted into a video signal and an audio signal in a format equivalent to those acquired when an analog broadcast is received. In this way, the present invention can provide an information processing apparatus and a television tuner that have a simplified configuration and that are capable of receiving a digital television broadcast and providing the operability the same as that for an analog television broadcast.

BRIEF DESCRIPTION OF THE DRAWINGS

FIG. 2 is a block diagram of an exemplary configuration of a tuner pack according to the embodiment;

FIG. 3 is a schematic illustration of a physical channel conversion table; and

FIG. 4 is a schematic illustration of a channel selection sequence.

DESCRIPTION OF THE PREFERRED EMBODIMENTS

Figure 1:
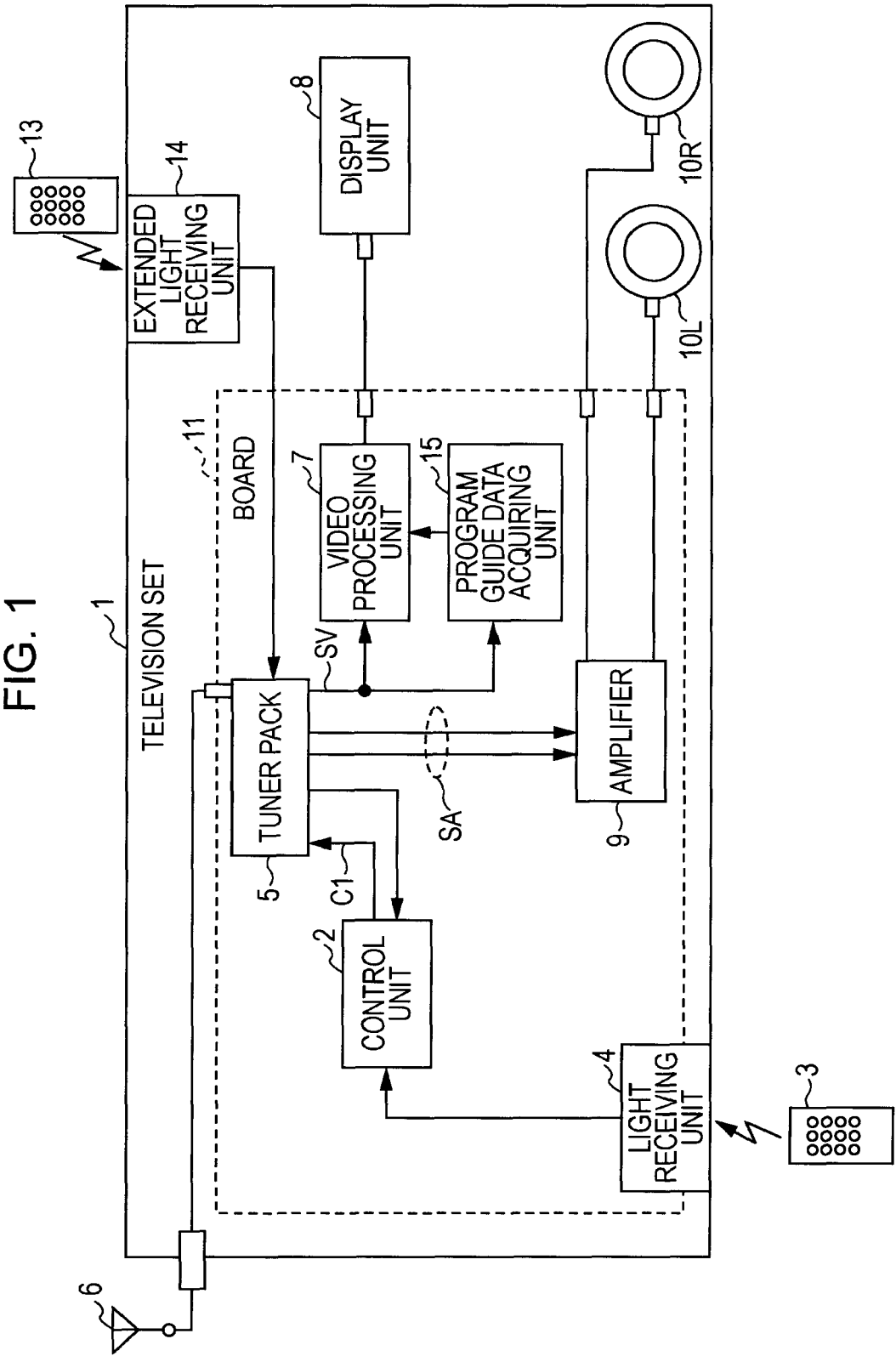
FIG. 1 is a block diagram of an exemplary configuration of a television set according to an embodiment of the present invention.

Exemplary embodiments of the present invention are described with reference to the accompanying drawings. Note that the descriptions are made in the following order:
1. Embodiment (Television Set), and
2. Other Embodiments.
1. Embodiment
1-1. Configuration of Television Set As shown in FIG. 1, under the control of a control unit 2, a television set 1 receives television broadcasting programs and allows users to view the video and listen to sounds of the television broadcasting programs.

The television set 1 is originally designed to receive analog broadcasting television programs. Accordingly, a remote controller 3 includes channel selection buttons used for selecting a television broadcasting channel based on an analog method (hereinafter referred to as an "analog television broadcasting channel") and a volume button used for controlling the volume level.

In accordance with a button pressed by a user, the remote controller 3 transmits a modulated infrared light signal.

A light receiving unit 4 receives the infrared light signal transmitted from the remote controller 3 and converts the infrared light signal into an electrical reception signal. Thereafter, the light receiving unit 4 supplies the reception signal to the control unit 2. The control unit 2 converts the reception signal into a control command and performs processing in accordance with the control command.

For example, when the control command is a channel selection command to select a broadcasting channel, the control unit 2 generates an analog channel selection signal C1 serving as an analog identification signal indicating the frequency corresponding to the broadcasting channel. Thereafter, the control unit 2 supplies the channel selection signal C1 to a tuner pack 5.

Using the broadcast signal acquired by receiving the broadcast waves through an antenna 6, the tuner pack 5 performs a receiving process of a television broadcasting program broadcasted on the frequency indicated by the analog channel selection signal C1 (described in more detail below).

In addition, the tuner pack 5 generates an analog video signal SV and an analog audio signal SA on the basis of the received broadcast signal. Thereafter, the tuner pack 5 supplies the video signal SV to a video processing unit 7 and supplies the audio signal SA to an amplifier 9.

Note that the video signal SV is a video signal based on, for example, a national television Standards Committee (NTSC) standard. In addition, the audio signal SA is an audio signal for the left and right channels. That is, the audio signal SA includes a left audio signal SAL for the left channel and a right audio signal SAR for the right channel.

The video processing unit 7 performs predetermined video processing on the video signal SV and supplies the video signal SV to a display unit 8. For example, the display unit 8 includes a cathode ray tube and a display control circuit. The display unit 8 displays a video image on the basis of the video signal SV.

The amplifier 9 amplifies each of the left audio signal SAL and right audio signal SAR of the audio signal SA. Thereafter, the amplifier 9 supplies the left audio signal SAL and right audio signal SAR to a left speaker 10L and a right speaker 10R, respectively. Thus, sounds based on the audio signal SA is output.

Note that the television set 1 includes the control unit 2, the light receiving unit 4, the tuner pack 5, and the amplifier 9 mounted on a board 11 made from a printed circuit board.

A program guide data acquiring unit 15 extracts program guide data superimposed on the video signal SV and stores the program guide data. Upon receiving a display command for displaying a TV program listing from a user, the control unit 2 instructs the video processing unit 7 to generate, for example, a program listing having program channels and the time information in the form of a table on the basis of the program guide data stored in the program guide data acquiring unit 15. Subsequently, the control unit 2 instructs the display unit 8 to display the program listing on the display unit 8.

As described above, the television set 1 receives television broadcasting by supplying, to the tuner pack 5, the analog channel selection signal C1 corresponding to the analog broadcasting channel indicated by a user. Thus, the television set 1 allows the user to view the video image and listen to the sound.

1-2. Configuration of Tuner Pack

In the television set 1, a tuner pack compatible with analog television broadcasting and mounted therein is replaced with the tuner pack 5 compatible with digital television broadcasting.

As shown in FIG. 2, the tuner pack 5 has a circuit configuration for digital television broadcasting programs. The tuner pack 5 performs overall control using a channel selection control unit 21.

Note that the tuner pack 5 does not have a pin assignment dedicated to the television set 1 and, therefore, the tuner pack 5 is not directly mounted on the board 11 (refer to FIG. 1). Accordingly, the tuner pack 5 is mounted on the board 11 via a pin terminal conversion adaptor 12. The pin terminal conversion adaptor 12 changes the pin terminal assignment so as to accommodate the circuit pattern of the board 11.

1-2-1. Conversion Into Digital Physical Channel

Note that it is difficult to change from analog television broadcasting to digital television broadcasting all at once, since the penetration rate of digital television sets is still low. Accordingly, a preparation period during which both analog and digital television broadcasting can be used is provided so that analog television sets are gradually replaced with digital television sets.

More specifically, in television broadcasting, the frequencies (equivalent to channels) for digital broadcasting are different from those for analog broadcasting. Broadcast stations broadcast, through digital broadcasting, television programs almost the same as television programs for analog broadcasting.

For example, in Tokyo, as shown in FIG. 3A, an analog terrestrial TV service "NHK general TV" is broadcasted using VHF (Very High Frequency) channel 1. In contrast, a digital terrestrial TV service "NHK general TV" is broadcasted using UHF (Ultra High Frequency) channel 27.

Hereinafter, in a broadcast station, physical channels for analog broadcasting and digital broadcasting are referred to as an "analog physical channel CA" and a "digital physical channel CD", respectively.

Note that in a digital method, a display channel is defined in addition to a physical channel. For example, a display channel "011" corresponds to a digital physical channel "UHF channel 27".

The tuner pack 5 can accept an operational instruction transmitted from an extended remote controller 13 in addition to an operational instruction transmitted from the remote controller 3. For example, in order to support various services that are not provided for analog television broadcasting, the extended remote controller 13 has operation buttons for digital broadcasting and operation buttons for data broadcasting. In addition, like the remote controller 3, the extended remote controller 13 transmits an infrared light signal subjected to a modulation process predetermined for a button that is pressed.

The tuner pack 5 is connected to an extended light receiving unit 14 that supports the extended remote controller 13. The extended light receiving unit 14 receives an infrared light signal from the extended remote controller 13 and coverts the infrared light signal into an electrical signal. Thereafter, the extended light receiving unit 14 supplies the electrical signal to an extended signal processing unit 22 of the tuner pack 5.

The extended signal processing unit 22 analyzes the electrical signal supplied from the extended light receiving unit 14 and determines which one of the operation buttons of the extended remote controller 13 is pressed. The extended signal processing unit 22 then generates an operation signal on the basis of the determination result and supplies the operation signal to the channel selection control unit 21.

The channel selection control unit 21 is designed to perform processing in accordance with an operation signal. For example, upon receiving an operation signal that indicates predetermined initial setting, the channel selection control unit 21 instructs the display unit 8 to display a menu screen (described in more detail below) and performs an initial setting process.

In the initial setting process, the channel selection control unit 21 assigns the digital physical channel CD of one of the broadcast stations to the analog physical channel CA and registers the correspondence therein.

At that time, the channel selection control unit 21 generates a physical channel conversion table TC that indicates a correspondence between the analog physical channel CA and the digital physical channel CD. Thereafter, the channel selection control unit 21 stores the physical channel conversion table TC in a nonvolatile memory 23. As a result, as shown in FIG. 3A, the physical channel conversion table TC includes the analog physical channel CA and the digital physical channel CD in association with each other. Note that the physical channel conversion table TC can further include the display channel.

However, the control unit 2 of the television set 1 (refer to FIG. 1) recognizes that the tuner pack 5 supports only analog broadcasting. Accordingly, the control unit 2 supplies the analog channel selection signal C1 that indicates the frequency for analog broadcasting (hereinafter referred to as an "analog frequency") to the tuner pack 5.

The tuner pack 5 supplies, to a channel selection signal analyzing unit 24, the analog channel selection signal C1 supplied from the control unit 2. The channel selection signal analyzing unit 24 analyzes which analog frequency is selected on the basis of the analog channel selection signal C1. Thereafter, the channel selection signal analyzing unit 24 converts the analog frequency into the analog physical channel CA and supplies the analog physical channel CA to a physical channel conversion unit 25.

Note that the channel selection signal analyzing unit 24 stores an analog channel table TA that associates an analog frequency with an analog physical channel CA. In practice, the channel selection signal analyzing unit 24 refers to the analog channel table TA and converts the analog frequency into the analog physical channel CA.

The physical channel conversion unit 25 refers to the physical channel conversion table TC stored in the nonvolatile memory 23 and converts the analog physical channel CA to the digital physical channel CD. Thereafter, the physical channel conversion unit 25 supplies the digital physical channel CD to the channel selection control unit 21.

In this way, using the analog channel selection signal C1 supplied from the control unit 2, the tuner pack 5 converts the broadcast station channel indicated by the analog channel selection signal C1 into the digital physical channel CD through which the television program is broadcasted in a digital format.

1-2-2. Reception of Digital Television Broadcast

Subsequently, the channel selection control unit 21 controls various circuits in the tuner pack 5 on the basis of the digital physical channel CD supplied from the channel selection signal analyzing unit 24.

A divider 31 divides a broadcast signal input through an antenna input terminal T1. The divider 31 supplies part of the input broadcast signal to a digital tuner 32 and supplies the rest of the broadcast signal to an antenna output terminal T2.

Note that the antenna output terminal T2 is designed to be connected to another apparatus that can receive a television broadcast signal (e.g., a video recorder).

The digital tuner 32 extracts, from the supplied broadcast signal, frequency part corresponding to the digital physical channel CD supplied from the channel selection control unit 21. Thereafter, the digital tuner 32 performs a predetermined demodulation process and a predetermined descrambling process on the extracted part and generates a transport stream TS.

The transport stream TS includes packetized encoded video data, audio data, and other various data multiplexed therein.

The digital tuner 32 supplies the transport stream TS to a demultiplexer unit 33.

The demultiplexer unit 33 demultiplexes the transport stream TS in accordance with a packet type. The demultiplexer unit 33 supplies a video data packet PV to a video decoder unit 34, an audio data packet PA to an audio decoder unit 35, and a caption data packet PT to a caption data processing unit 36.

In addition, the demultiplexer unit 33 supplies a data broadcasting content packet PC to a data broadcasting content processing unit 37 and supplies an SI EPG (Service Information Electronic Program Guide) packet PG to an SI EPG data extracting unit 38.

The video decoder unit 34 extracts video data from the video data packet PV and performs a predetermined decoding process on the video data. Thus, the video decoder unit 34 generates a digital video signal DV. Thereafter, the video decoder unit 34 supplies the generated digital video signal DV to a video random access memory (VRAM) 39.

The caption data processing unit 36 extracts caption data including character codes from the caption data packet PT and visualizes the extracted caption data. Thus, the caption data processing unit 36 generates a digital caption video signal DVT and supplies the digital caption video signal DVT to a VRAM 40.

The data broadcasting content processing unit 37 extracts the content of data broadcasting from the data broadcasting content packet PC and visualizes the content. Thus, the data broadcasting content processing unit 37 generates a digital content video signal DVC and supplies the generated digital content video signal DVC to a VRAM 41.

Note that the caption data processing unit 36 and the data broadcasting content processing unit 37 (hereinafter collectively referred to an "additional information video processing unit 42") generate the caption video signal DVT and the content video signal DVC in accordance with an operation performed by the user using the extended remote controller 13.

Upon receiving, from the channel selection control unit 21, an operation signal in accordance with pressing of one of the operation buttons of the extended remote controller 13, a menu screen generating unit 43 generates a menu screen video signal DVM representing a graphical user interface (GUI) screen. Thereafter, the menu screen generating unit 43 supplies the generated menu screen video signal DVM to a VRAM 44.

A video signal combining unit 45 acquires the digital video signal DV, the digital caption video signal DVT, the digital content video signal DVC, and the menu screen video signal DVM from the VRAMs 39, 40, 41, and 44, respectively, at predetermined intervals. Thereafter, the video signal combining unit 45 combines these video signals and generates a combined video signal DVS.

Note that the video signal combining unit 45 selects video signals to be combined in accordance with an instruction input to the extended remote controller 13.

Subsequently, the video signal combining unit 45 supplies the combined video signal DVS to a D/A (Digital-to-Analog) conversion unit 46. The D/A conversion unit 46 converts the combined video signal DVS having a digital format into a video signal SVS having an analog format and supplies the video signal SVS to an encoder unit 47.

The encoder unit 47 generates a video signal SV by converting the video signal SVS into a video signal compatible with the NTSC format. Thereafter, the encoder unit 47 supplies the video signal SV to the video processing unit 7 via the pin terminal conversion adaptor 12 and the board 11 (refer to FIG. 1).

The audio decoder unit 35 generates a digital audio signal DA by extracting audio data from the audio data packet PA and performing a predetermined decoding process on the audio data. Thereafter, the audio decoder unit 35 supplies the digital audio signal DA to a D/A conversion unit 48.

The D/A conversion unit 48 converts the audio signal DA having a digital format into the audio signal SA having an analog format. Thereafter, the D/A conversion unit 48 supplies the audio signal SA to the amplifier 9 via the pin terminal conversion adaptor 12 and the board 11 (refer to FIG. 1).

In this way, the tuner pack 5 receives a broadcast signal of the digital physical channel CD supplied from the channel selection control unit 21 and generates the digital video signal DV and the digital audio signal DA. Thereafter, the tuner pack 5 converts the digital video signal DV and the digital audio signal DA into the analog video signal SV and the analog audio signal SA, respectively.

1-2-3. Generation of Program Guide Signal

The SI EPG data extracting unit 38 extracts SI EPG data representing information regarding television programs from the SI EPG packet PG. Thereafter, the SI EPG data extracting unit 38 supplies the extracted SI EPG data to a program guide data conversion unit 49.

The program guide data conversion unit 49 converts the SI EPG data into program guide data compatible with, for example, the G guide (trade name). Thereafter, the program guide data conversion unit 49 supplies the converted program guide data to a vertical blanking interval (VBI) data generating unit 50.

The VBI data generating unit 50 converts the program guide data into VBI data. Thereafter, the VBI data generating unit 50 supplies the VBI data to the encoder unit 47.

At that time, the encoder unit 47 superimposes the VBI data on the VBI portion of the video signal SV compatible with the NTSC format generated using the video signal SVS. Thereafter, the encoder unit 47 outputs the video signal SV.

As a result, the program guide data acquiring unit 15 (refer to FIG. 1) of the television set 1 can extract the program guide data superimposed on the video signal SV in the form of VBI data. Thereafter, the program guide data acquiring unit 15 can display a program listing screen on the display unit 8 on the basis of the extracted program guide data.

1-3. Tuning Process and Muting Process

A tuner pack using an analog method is designed to output a tuning ACK signal SK having a "Low" level during a non-tuning period of time and output the tuning ACK signal SK having a "High" level during a tuning period of time after the analog channel selection signal C1 is supplied.

Accordingly, after the control unit 2 of the television set 1 supplies the analog channel selection signal C1 to the tuner pack, the control unit 2 monitors the tuning ACK signal SK supplied from the tuner pack.

If the tuning ACK signal SK becomes a "High" level after supplying the analog channel selection signal C1, the control unit 2 determines that the tuner pack has successfully received the broadcast signal.

However, if the tuning ACK signal SK remains in a "Low" level after a predetermined period of time has elapsed, the control unit 2 determines that the frequency indicated by the analog channel selection signal C1 is inappropriate. Accordingly, the control unit 2 slightly changes the frequency and supplies the analog channel selection signal C1 to the tuner pack again.

In this way, the control unit 2 can fine-tune the received frequency. As a result, the control unit 2 can acquire an optimal video signal and an optimal audio signal having a minimized noise component. Hereinafter, such a series of processes is referred to as an "analog tuning process".

However, the tuner pack 5 that complies with a digital method receives a broadcast signal having a format different from that for an analog method. Accordingly, a technique used for the tuning process in order to acquire optimal video signal and audio signal differs from that for the analog tuning process.

In practice, the tuner pack 5 performs a predetermined digital tuning process that is suitable for a digital method by using the channel selection control unit 21.

Accordingly, the channel selection control unit 21 is designed to generate a pseudo tuning ACK signal SK using an output terminal signal control unit 26. More specifically, if the digital tuner 32 can successfully receive a broadcast signal of the digital physical channel CD, the channel selection control unit 21 changes the level of the tuning ACK signal SK from a "Low" level to a "High" level using the output terminal signal control unit 26.

Thus, the control unit 2 of the television set 1 can recognize the tuner pack as a tuner pack of an analog method normally operated for a broadcast signal at a frequency indicated by the analog channel selection signal C1.

In this way, the channel selection control unit 21 performs so-called emulation by controlling the tuning ACK signal SK via the output terminal signal control unit 26. Thus, the digital tuning process is adaptable with the analog tuning process performed by the control unit 2 of the television set 1.

Note that, in general, when a program is not broadcasted from a broadcast station in, for example, late night hours or when a broadcast signal itself is not transmitted, a video signal SV and an audio signal SA generated by a tuner pack do not include a video image and sound having appropriate levels.

At that time, if the control unit 2 of the television set 1 directly supplies the video signal SV to the display unit 8, the display unit 8 displays an unviewable image. In addition, if the control unit 2 directly supplies the audio signal SA to the amplifier 9, the amplifier 9 outputs noise.

Accordingly, after supplying the analog channel selection signal C1, the control unit 2 of the television set 1 monitors whether the video signal SV and the audio signal SA include an image and sound having appropriate signal levels.

More specifically, if the signal level of the video signal SV is smaller than a predetermined level, the control unit 2 determines that a video image based on the video signal SV should not be displayed. Thus, the control unit 2 instructs the video processing unit 7 to display a solid blue or black background on the display unit 8 (i.e., the video is muted).

In addition, the control unit 2 determines that the sound based on the audio signal SA should not be output. Thus, the control unit 2 minimizes the audio level using a sound volume control unit (not shown) (i.e., the sound is muted).

In this way, the control unit 2 monitors the video signal SV. If the control unit 2 determines that a television program is not broadcasted, the control unit 2 performs a muting process so that the video and sound are muted.

1-4. Channel Selection Sequence

In practice, the control unit 2 and the channel selection control unit 21 perform a channel selection process of a television program in accordance with the sequence illustrated in FIG. 4.

That is, when the television set 1 is turned on, the control unit 2 starts a channel selection sequence RT1 of the television set 1, and the processing proceeds to step SP1.

At step SP1, the control unit 2 instructs the light receiving unit 4 to receive an infrared light signal transmitted from the remote controller 3 and generate a received light signal on the basis of the infrared light signal. Thereafter, the processing proceeds to step SP2.

If, in step SP2, a control command converted from the received light signal is a channel selection command, the control unit 2 generates the analog channel selection signal C1 in accordance with the channel selection command and supplies the analog channel selection signal C1 to the tuner pack 5. Thereafter, the processing proceeds to step SP3.

On the other hand, when the television set 1 is turned on, the tuner pack 5 starts a channel selection sequence RT2 of the tuner pack 5, and the processing proceeds to step SP11.

In step SP11, the channel selection control unit 21 waits until the analog channel selection signal C1 transmitted from the control unit 2 is received by the channel selection signal analyzing unit 24. Upon receiving the analog channel selection signal C1, the processing proceeds to step SP12.

In step SP12, the channel selection control unit 21 instructs the channel selection signal analyzing unit 24 and the physical channel conversion unit 25 to convert the analog channel selection signal C1 into the digital physical channel CD using the physical channel conversion table TC. Thereafter, the processing proceeds to step SP13.

In step SP13, the channel selection control unit 21 instructs the digital tuner 32 to receive a broadcast signal of a frequency corresponding to the digital physical channel CD and extract the transport stream TS. Thereafter, the processing proceeds to step SP14.

If, in step SP14, the channel selection control unit 21 can receive a broadcast signal of a frequency corresponding to the digital physical channel CD, the channel selection control unit 21 instructs the output terminal signal control unit 26 to transmit the tuning ACK signal SK. Thereafter, the processing proceeds to step SP15.

At that time, in the television set 1, the control unit 2, in step SP3, waits until the tuning ACK signal SK is received. Upon receiving the tuning ACK signal SK, the processing proceeds to step SP4.

In step SP15, the channel selection control unit 21 instructs the demultiplexer unit 33 to separate the video data packet PV and the audio data packet PA from the transport stream TS. In addition, the channel selection control unit 21 instructs the video decoder unit 34 and the audio decoder unit 35 to generate the digital video signal DV and the digital audio signal DA using the video data packet PV and the audio data packet PA. Thereafter, the processing proceeds to step SP16.

In step SP16, the channel selection control unit 21 generates the analog video signal SV and the analog audio signal SA using the digital video signal DV and the digital audio signal DA. The channel selection control unit 21 then outputs the analog video signal SV and the analog audio signal SA to the television set 1. Thereafter, the processing proceeds to step SP17, where the channel selection control unit 21 completes the channel selection sequence RT2.

At that time, in the television set 1, the control unit 2, in step SP4, monitors the video signal SV. If the control unit 2 detects the video signal SV having a level higher than or equal to a predetermined level or a predetermined period of time has elapsed since the analog channel selection signal C1 was transmitted, the processing proceeds to step SP5.

In step SP5, the control unit 2 determines whether the signal level of the video signal SV is higher than or equal to a predetermined level. If it is determined that the signal level of the video signal SV is higher than or equal to the predetermined level, the control unit 2 can determine that a television program is broadcasted using a TV broadcasting channel indicated by the channel selection command. Thus, the video image based on the broadcast signal can be displayed, and the sound based on the broadcast signal can be output.

At that time, the control unit 2 directly displays the video image based on the video signal SV and outputs the sound based on the audio signal SA. Thereafter, the processing proceeds to step SP7, where the control unit 2 completes the channel selection sequence RT1.

However, if, in step SP5, it is determined that the signal level of the video signal SV is lower than the predetermined level, the control unit 2 can determine that a television program is not broadcasted using a TV broadcasting channel indicated by the channel selection command. Thus, usable video image and sound are not acquired. In such a case, the processing of the control unit 2 proceeds to step SP6.

In step SP6, the control unit 2 mutes the video and sound. Thereafter, the processing proceeds to step SP7, where the control unit 2 completes the channel selection sequence RT1.

Note that if, in step SP3, the control unit 2 does not acquire the tuning ACK signal SK within a predetermined period of time, the control unit 2 slightly changes the frequency indicated by the analog channel selection signal C1 and searches for a frequency that can be successfully received (tuned).

1-5. Operation and Advantages

In the above-described configuration, upon receiving a channel selection command through the remote controller 3, the control unit 2 of the television set 1 generates the analog channel selection signal C1 corresponding to the channel selection command and supplies the analog channel selection signal C1 to the tuner pack 5.

Under the control of the channel selection control unit 21, the channel selection signal analyzing unit 24 of the tuner pack 5 analyzes the analog channel selection signal C1 and converts the channel into the analog physical channel CA. Subsequently, the physical channel conversion unit 25 refers to the physical channel conversion table TC stored in the nonvolatile memory 23 and converts the analog physical channel CA into the digital physical channel CD.

Subsequently, the channel selection control unit 21 extracts the transport stream TS from the broadcast signal of a frequency corresponding to the digital physical channel CD and separates the transport stream TS into various packets. Thereafter, the channel selection control unit 21 performs a decoding process on the packets and generates the digital video signal DV and the digital audio signal DA.

The channel selection control unit 21 converts the digital video signal DV and the digital audio signal DA into the analog video signal SV and the analog audio signal SA, respectively. Thereafter, the analog video signal SV and the analog audio signal SA are supplied to the television set 1.

At that time, the control unit 2 of the television set 1 instructs the display unit 8 to display a video image based on the video signal SV. In addition, the control unit 2 outputs the sound based on the audio signal SA from the left speaker 10L and the right speaker 10R.

Accordingly, as in the case in which an analog tuner pack is mounted, the control unit 2 of the television set 1 can allow the users to view the video and listen to the sound of the digital television broadcasting by simply supplying the analog channel selection signal C1.

At that time, the tuner pack 5 can convert the analog physical channel CA acquired from the analog channel selection signal C1 into the digital physical channel CD by referring to the physical channel conversion table TC in the physical channel conversion unit 25 (refer to FIG. 3A).

In this way, although the tuner pack 5 acquires the analog channel selection signal C1 that indicates the analog frequency of a broadcast station that the user wants to watch, the tuner pack 5 can receive the broadcast signal of a program that the broadcast station indicated by the analog frequency broadcasts in a digital format.

As a result, the television set 1 can allow the user to view the video and listen to the sound of digital television broadcasting broadcasted from a broadcast station that the user wants when the user operates, for example, the remote controller 3 and simply selects the analog physical channel.

In addition, the tuner pack 5 accepts the analog channel selection signal C1 that is the same as that in the analog tuner pack and outputs the video signal SV and the audio signal SA having the same formats.

Accordingly, the control unit 2 of the television set 1 can perform a control process that is completely the same as the control process performed in the analog tuner pack. In addition, as in the case in which an analog tuner pack is mounted, the television set 1 can directly supply the video signal SV and the audio signal SA received from the tuner pack 5 to the display unit 8 and the amplifier 9, respectively.

Furthermore, the tuner pack 5 generates program guide data on the basis of the SI EPG signal contained in the digital broadcast signal and superimposes the program guide data on the video signal SV as VBI data. Thereafter, the tuner pack 5 outputs the VBI data to the television set 1.

Accordingly, as in the case in which program guide data is superimposed on an analog broadcast signal, the television set 1 can extract the program guide data superimposed on the video signal SV using the program guide data acquiring unit 15 and display a program listing.

Furthermore, the tuner pack 5 controls the tuning ACK signal SK in accordance with whether the tuner pack 5 has successfully received the broadcast signal of the digital physical channel CD or not. In this way, the control unit 2 of the television set 1 can determine whether the frequency indicated by the analog channel selection signal C1 is properly tuned using the tuning ACK signal SK.

Accordingly, by simply executing a channel selection sequence that is the same as the channel selection sequence for the analog tuner pack, the control unit 2 can allow the digital tuner pack 5 to select the channel.

In practice, in the near future, the analog television broadcasting service will be stopped, and only the digital television broadcasting service continues. Accordingly, television sets that include only an analog tuner will be unable to receive any television program after the analog television broadcasting service ceases.

However, by replacing an analog tuner pack with the digital tuner pack 5 according to the present embodiment of the present invention, even such television sets can receive digital television broadcasting programs.

In this case, the user interfaces, such as a remote controller of the television set and menu screens, can be used without any modification. Accordingly, when the tuner pack is replaced, it is not necessary for the user to learn a new operation sequence and, therefore, the user can operate the television set using a familiar operation sequence.

In addition, the television set 1 can continue to use various control programs executed by the control unit 2 and the circuits other than the tuner pack without any modification.

In addition, in this case, the components of the television set, such as the body, the display unit, the circuit board, and the speakers, can be used without any modification. Accordingly, these components do not have to be discarded and, therefore, these components are more effectively used, as compared with recycling of the components.

Furthermore, since the tuner pack 5 is mounted on the board 11 of the television set 1 using the pin terminal conversion adaptor 12, the tuner pack 5 can be mounted on other circuit boards having a pin assignment different from that of the board 11 by using a pin terminal conversion adaptor 12 that supports the pin assignment.

A variety of types of analog tuner pack have been widely used. In general, the standard of the pin assignment has not been developed. However, the types of input and output signal line and the number of the input and output signal lines are almost the same.

Accordingly, by preparing a pin terminal conversion adaptor 12 for each of the analog tuner packs, the tuner pack 5 can be mounted in a television set having an analog tuner pack of any type mounted therein.

In addition, since the body of the television set 1 can incorporate the digital tuner pack 5, it is not necessary for the television set 1 to prepare a space for the tuner pack 5, as compared with the case in which an STB supporting digital broadcasting is additionally used.

According to the above-described configuration, the tuner pack 5 of the television set 1 converts the analog channel selection signal C1 supplied from the control unit 2 of the television set 1 into the analog physical channel CA. In addition, the tuner pack 5 refers to the physical channel conversion table TC and converts the analog physical channel CA into the digital physical channel CD. Subsequently, the tuner pack 5 generates the digital video signal DV and the digital audio signal DA using a broadcast signal of a frequency corresponding to the digital physical channel CD. In addition, the tuner pack 5 converts the digital video signal DV and the digital audio signal DA into the analog video signal SV and the analog audio signal SA and supplies the video signal SV and the audio signal SA to the television set 1. In this way, as in the case in which an analog tuner pack is mounted in the television set 1, the control unit 2 of the television set 1 can allow the user to view a video image based on the video signal SV and listen to the sound based on the audio signal SA.

2. Other Embodiments

The foregoing embodiment has been described with reference to the case in which the analog channel selection signal C1 output from the control unit 2 indicates the analog frequency.

However, the present invention is not limited thereto. For example, the analog channel selection signal C1 may indicate other information (e.g., the analog physical channel CA). In such a case, the channel selection signal analyzing unit 24 can be removed from the tuner pack 5, and the physical channel conversion unit 25 can directly convert the analog channel selection signal C1 into the digital physical channel CD.

At that time, the analog channel selection signal C1 that represents information used for an analog or digital tuner pack to identify an analog television frequency to be received can be used.

In addition, the foregoing embodiment has been described with reference to the case in which a correspondence between the analog physical channel CA and the digital physical channel CD is stored in the physical channel conversion table TC.

However, the present invention is not limited thereto. For example, a correspondence between the analog physical channel CA and the frequency at which digital television program is broadcasted may be stored in the physical channel conversion table TC. That is, information used for the channel selection control unit 21 of the tuner pack 5 to determine which frequency is to be selected in order to receive a broadcast signal is sufficient.

Furthermore, the foregoing embodiment has been described with reference to the case in which the channel selection signal analyzing unit 24 converts the analog channel selection signal C1 into the analog physical channel CA and the physical channel conversion unit 25 converts the analog physical channel CA into the digital physical channel CD.

However, the present invention is not limited thereto. For example, a correspondence between the analog channel selection signal C1 and the digital physical channel CD may be stored in the physical channel conversion table TC, and the physical channel conversion unit 25 may directly convert the analog channel selection signal C1 into the digital physical channel CD.

Still furthermore, the foregoing embodiment has been described with reference to the case in which the tuner pack 5 acquires only the analog channel selection signal C1 from the control unit 2.

However, the present invention is not limited thereto. For example, the tuner pack 5 may acquire various information from the television set 1. For instance, the tuner pack 5 may acquire, from the control unit 2, a band signal indicating which one of frequency ranges (bands) VHF-Low, VHF-High, and UHF the analog physical channel CA belongs to.

In such a case, the tuner pack 5 can convert, using the channel selection signal analyzing unit 24, the band signal into the analog physical channel CA on the basis of a combination of the band signal and the analog channel selection signal C1. If the tuner pack 5 directly converts, using the physical channel conversion unit 25, the analog channel selection signal C1 into the digital physical channel CD, a combination of the analog channel selection signal C1 and the band signal can be associated with the digital physical channel CD.

In addition, the foregoing embodiment has been described with reference to the case in which the output terminal signal control unit 26 of the tuner pack 5 controls the tuning ACK signal SK in accordance with a reception result through the digital physical channel CD.

However, the present invention is not limited thereto. For example, the tuner pack 5 may generate, through, for example, emulation, pseudo notification signals corresponding to various notification signals that various circuits of the television set 1 are to originally acquire from the analog tuner pack. Thereafter, the tuner pack 5 may supply the generated various notification signals to the circuits. If the television set 1 does not acquire a notification signal, it is not necessary for the tuner pack 5 to generate the notification signals.

In addition, the foregoing embodiment has been described with reference to the case in which the physical channel conversion table TC further contains a display channel.

However, the present invention is not limited thereto. For example, it is not necessary for the physical channel conversion table TC to contain a display channel. Alternatively, the physical channel conversion table TC may contain various information, such as image quality settings, for each channel.

In addition, the foregoing embodiment has been described with reference to the case in which the SI EPG packet PG is converted into program guide data using, for example, the SI EPG data extracting unit 38, and the program guide data is converted into VBI data, which is then superimposed on the video signal SV.

However, the present invention is not limited thereto. For example, if the television set 1 does not have a function of displaying a program guide and, therefore, the television set 1 does not include the program guide data acquiring unit 15, the SI EPG data extracting unit 38 may be removed from the tuner pack 5. In addition, if the user of the television set 1 does not use a caption display function and a data broadcast function of the digital broadcasting, the caption data processing unit 36 and the data broadcasting content processing unit 37 may be removed from the tuner pack 5. In such a case, the extended remote controller 13 and the extended light receiving unit 14 may be also removed.

In addition, the foregoing embodiment has been described with reference to the case in which, in an initial setting process, the user operates the extended remote controller 13 and registers the digital physical channel CD in association with the analog physical channel CA for each of the broadcast stations.

However, the present invention is not limited thereto. For example, when the tuner pack 5 is manufactured, a pregenerated physical channel conversion table TC may be stored in the nonvolatile memory 23. In such a case, the extended remote controller 13 and the extended light receiving unit 14 can be removed.

Still furthermore, the foregoing embodiment has been described with reference to the case in which the tuner pack 5 is mounted on the board 11 of the television set 1 via the pin terminal conversion adaptor 12.

However, the present invention is not limited thereto. For example, if the pin assignment of the tuner pack 5 is designed only for the board 11 of the television set 1, the pin terminal conversion adaptor 12 may be removed, and the tuner pack 5 may be directly mounted on the board 11.

Still furthermore, the foregoing embodiment has been described with reference to the case in which, in the television set 1 that receives a television broadcast program and allows the user to watch the television program, the analog tuner pack is replaced with the digital tuner pack 5.

However, the present invention is not limited thereto. For example, in a variety of information processing apparatuses including an analog tuner pack and receiving an analog broadcast television program, the analog tuner pack may be replaced with the digital tuner pack 5.

In addition, for example, in a video recording and playback apparatus that records and plays back an analog television program, the analog tuner pack may be replaced with the digital tuner pack 5.

Many video recording and playback apparatuses allow the user to select a television program to be recorded using a program guide generated from the program guide information. The tuner pack 5 converts the SI EPG packet PG into the program guide data using, for example, the SI EPG data extracting unit 38 and superimposes the program guide data on the video signal SV. Accordingly, the user can select a television program using a TV program listing without changing an operating procedure.

In addition, the foregoing embodiment has been described with reference to the case in which a broadcast signal is converted into the video signal SV having the NTSC format by the encoder unit 47. However, the present invention is not limited thereto. For example, a broadcast signal may be converted into the video signal SV having another format, such as the PAL format or SECAM format. That is, the video signal SV that is supplied to the television set 1 can have any format as long as the video signal SV complies with the format supported by the video processing unit 7 and the display unit 8.

Furthermore, the foregoing embodiment has been described with reference to the case in which the tuner pack 5 that receives a digital terrestrial television program is mounted in the television set 1 originally designed to receive an analog terrestrial television program.

However, the present invention is not limited thereto. For example, the tuner pack 5 that receives a digital BS (Broadcast Satellite) television program is mounted in the television set 1 originally designed to receive an analog BS television program. In such a case, in place of the physical channel conversion table TC for terrestrial broadcasting shown in FIG. 3A, the nonvolatile memory 23 can contain the physical channel conversion table TC for BS broadcasting shown in FIG. 3B. In addition, the digital tuner 32 can support digital BS broadcasting. The same is also applied to CS (Communication Satellite) television broadcasting and cable television broadcasting.

In addition, the foregoing embodiment has been described with reference to the case in which the television set 1 serving as an information processing apparatus includes the remote controller 3 and the light receiving unit 4 serving as an operation receiving unit, the control unit 2 serving as an identification signal generating unit, the channel selection signal analyzing unit 24 serving as an identification signal acquiring unit, the nonvolatile memory 23 serving as a storage unit, the physical channel conversion unit 25 serving as an identification signal conversion unit, the digital tuner 32 serving as a broadcast receiving unit, the video decoder unit 34, the video signal combining unit 45, and the D/A conversion unit 46 serving as a video conversion unit, the audio decoder unit 35 and the D/A conversion unit 48 serving as an audio conversion unit, the video processing unit 7 serving as an analog video acquiring unit, and the amplifier 9 serving as an analog sound acquiring unit.

However, the present invention is not limited thereto. For example, the information processing apparatus may include an operation receiving unit, an identification signal generating unit, a storage unit, an identification signal conversion unit, a broadcast receiving unit, a video conversion unit, an audio conversion unit, an analog video acquiring unit, and an analog sound acquiring unit having a variety of different configurations.

Still furthermore, the foregoing embodiment has been described with reference to the case in which the tuner pack 5 serving as a television tuner includes the channel selection signal analyzing unit 24 serving as an identification signal acquiring unit, the nonvolatile memory 23 serving as a storage unit, the physical channel conversion unit 25 serving as an identification signal conversion unit, the digital tuner 32 serving as a broadcast receiving unit, the video decoder unit 34, the video signal combining unit 45, and the D/A conversion unit 46 serving as a video conversion unit, and the audio decoder unit 35 and the D/A conversion unit 48 serving as an audio conversion unit.

However, the present invention is not limited thereto. For example, the television tuner may include an operation receiving unit, an identification signal generating unit, an identification signal acquiring unit, a storage unit, an identification signal conversion unit, a broadcast receiving unit, a video conversion unit, and an audio conversion unit having a variety of different configurations.

The present application contains subject matter related to that disclosed in Japanese Priority Patent Application JP 2009-100172 filed in the Japan Patent Office on Apr. 16, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
an operation receiving unit configured to wait for input of an operation to select an analog television broadcast channel;
an identification signal generating unit configured to generate, on the basis of the selected channel, an analog identification signal for identifying a frequency at which a broadcast signal is broadcasted in an analog format;
an identification signal acquiring unit configured to acquire the analog identification signal from the identification signal generating unit;
a storage unit configured to prestore correspondence information regarding a correspondence between a digital identification signal for identifying a frequency at which a broadcast signal is broadcasted in a digital format and the analog identification signal for each of broadcast stations;
an identification signal conversion unit configured to convert the analog identification signal into the digital identification signal using the correspondence information;
a broadcast receiving unit configured to receive a digital broadcast signal using the frequency identified by the digital identification signal converted by the identification signal conversion unit and extract digital video code and audio code;
a video conversion unit configured to convert the digital video code into an analog video signal having a video format equivalent to a video signal acquired from an analog television broadcast;
an audio conversion unit configured to convert the digital audio code into an analog audio signal having an audio format equivalent to an audio signal acquired from an analog television broadcast;
an analog video acquiring unit configured to acquire the analog video signal; and
an analog sound acquiring unit configured to acquire the analog audio signal.

2. The information processing apparatus according to claim 1, further comprising:
a pseudo notification signal generating unit configured to generate, in accordance with a result of reception of the digital broadcast signal, a pseudo notification signal equivalent to a notification signal to be generated by a television tuner that receives an analog broadcast signal when the television tuner receives the analog broadcast signal;
wherein the identification signal generating unit considers the pseudo notification signal as the notification signal received from the television tuner that receives an analog broadcast signal and performs processing on the basis of the notification signal.

3. The information processing apparatus according to claim 2, wherein the notification signal serves as a tuning signal to be supplied from the television tuner that receives an analog broadcast signal when the television tuner receives the analog broadcast signal, and wherein the pseudo notification signal generating unit generates a pseudo tuning signal equivalent to the tuning signal when the broadcast receiving unit receives the digital broadcast signal.

4. The information processing apparatus according to claim 1, wherein the analog identification signal indicates an analog frequency at which an analog television broadcast signal is broadcasted.

5. The information processing apparatus according to claim 4, further comprising:
an analyzing unit configured to analyze the analog frequency indicated by the analog identification signal and converts the analog frequency into an analog physical channel corresponding to the analog frequency;
wherein the digital identification signal indicates a digital physical channel corresponding to a digital frequency at which a digital television broadcast signal is broadcasted, and wherein the correspondence information includes a correspondence between the analog physical channel converted by the analyzing unit and the digital physical channel.

6. The information processing apparatus according to claim 4, wherein the identification signal generating unit generates a frequency band signal for identifying a frequency band with which the analog broadcast signal is broadcasted together with the analog identification signal, and wherein the identification signal acquiring unit acquires the frequency band signal together with the analog identification signal, and wherein the correspondence information includes a correspondence between the digital identification signal and a combination of the frequency band signal and the analog identification signal for each of broadcast stations, and wherein the identification signal conversion unit converts the combination of the frequency band signal and the analog identification signal into the digital identification signal.

7. The information processing apparatus according to claim 1, wherein the analog identification signal indicates an analog physical channel through which an analog television broadcast signal is broadcasted.

8. The information processing apparatus according to claim 1, further comprising:
a digital broadcasting operation unit that supports the digital television broadcast.

9. The information processing apparatus according to claim 8, wherein the storage unit prestores, as the correspondence information, a correspondence between the digital identification signal assigned to each of the broadcast stations by a user operation through the digital broadcasting operation unit and the analog identification signal.

10. The information processing apparatus according to claim 8, further comprising:
an additional information video generating unit configured to generate additional information video using additional information contained in the digital broadcast signal in response to a user operation through the digital broadcasting operation unit; and
a combining unit configured to combine the additional information video with video indicated by the video signal.

11. The information processing apparatus according to claim 10, wherein the additional information video generating unit generates caption video by visualizing caption code representing a caption as the additional information video.

12. The information processing apparatus according to claim 10, wherein the additional information video generating unit generates data broadcast video by decoding data broadcast code representing data broadcast content as the additional information video.

13. The information processing apparatus according to claim 1, further comprising:
- an extracting unit configured to extract digital program guide information representing a television program guide from the digital broadcast signal;
- a conversion unit configured to convert the digital program guide information into converted program guide information having a format equivalent to a format of analog program guide information representing television program guide included in the analog broadcast signal;
- a superimposing unit configured to superimpose the converted program guide information on the video signal; and
- a program guide information acquiring unit configured to acquire the converted program guide information from the video signal.

14. A television tuner comprising:
- an identification signal acquiring unit configured to acquire an analog identification signal for identifying a frequency at which a broadcast signal is broadcasted in an analog format, the identification signal being generated in accordance with a television channel selecting operation;
- a storage unit configured to prestore correspondence information regarding a correspondence between a digital identification signal for identifying a frequency at which a broadcast signal is broadcasted in a digital format and the analog identification information for each of broadcast stations;
- an identification signal conversion unit configured to convert the analog identification signal into the digital identification signal using the correspondence information;
- a broadcast receiving unit configured to receive a digital broadcast signal using the frequency identified by the digital identification signal converted by the identification signal conversion unit and extract digital video code and audio code;
- a video conversion unit configured to convert the digital video code into an analog video signal having a video format equivalent to a video signal acquired from an analog television broadcast; and
- an audio conversion unit configured to convert the digital audio code into an analog audio signal having an audio format equivalent to an audio signal acquired from an analog television broadcast.

* * * * *